July 1, 1930. H. GILLIES 1,768,900
FRICTION BRAKE
Filed Oct. 19, 1928
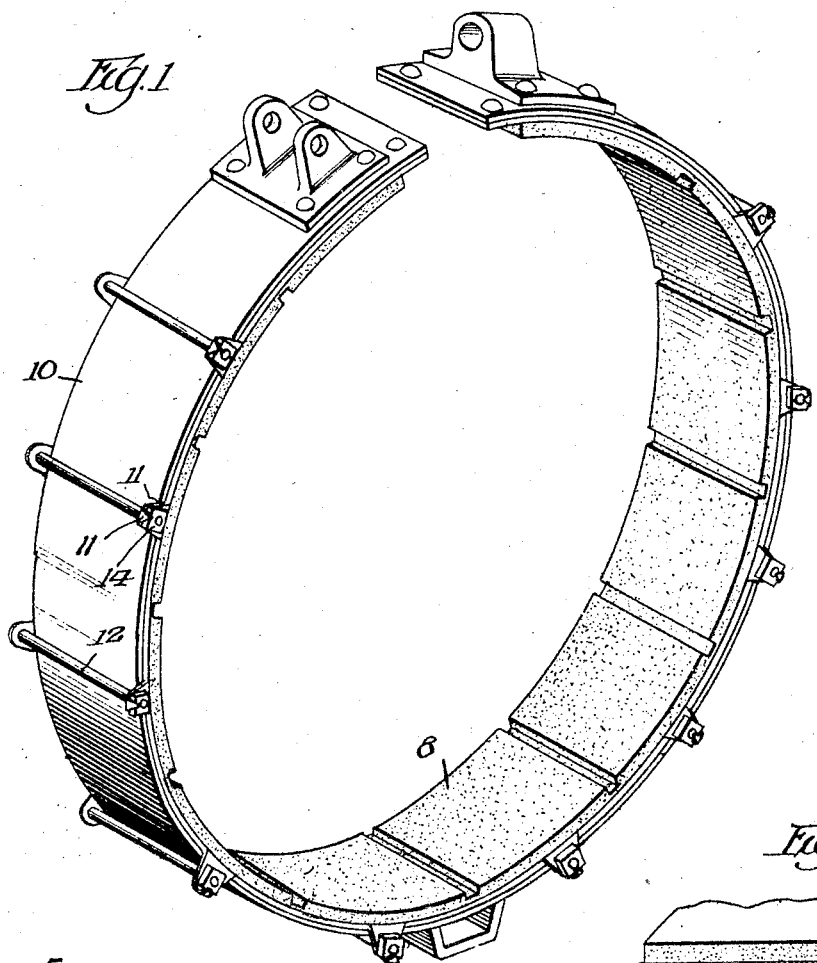
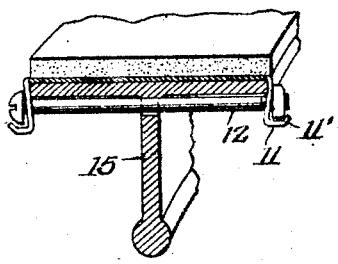
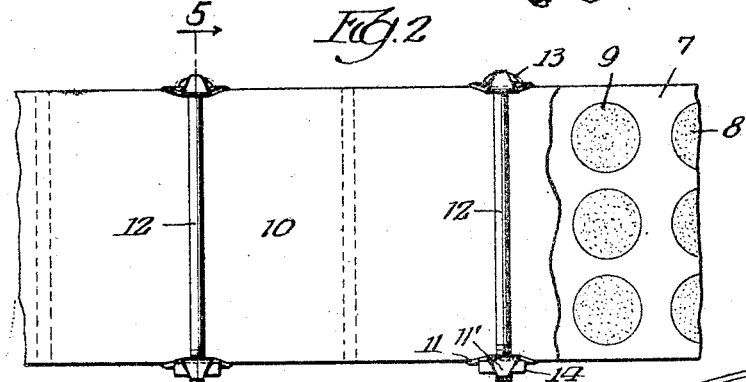
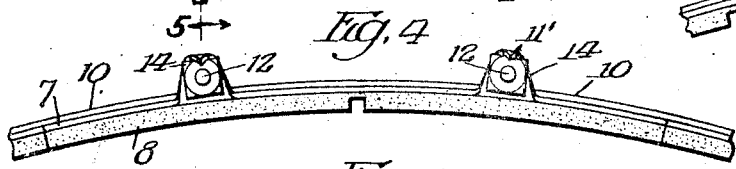
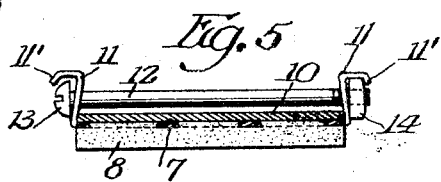
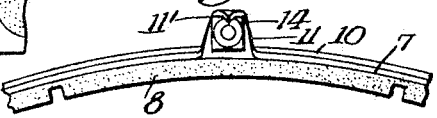
Inventor
Hugh Gillies
By Wm. O. Belt Atty.

Patented July 1, 1930

1,768,900

UNITED STATES PATENT OFFICE

HUGH GILLIES, OF DETROIT, MICHIGAN, ASSIGNOR TO AMERICAN BRAKE MATERIALS CORPORATION, OF NEW YORK, N. Y., A CORPORATION OF NEW YORK

FRICTION BRAKE

Application filed October 19, 1928. Serial No. 313,467.

This invention relates to friction brakes and more particularly to means for fastening a friction block to the brake band of an external brake and to the shoe or head of an internal brake.

The primary object of the invention is to provide simple means whereby a brake block in strip form or in a single unit may be easily and quickly and securely fastened to a brake band or shoe or head or other support.

In the accompanying drawings I have illustrated a selected embodiment of the invention and referring thereto:

Fig. 1 is a perspective view of a brake band having my invention applied thereto.

Fig. 2 is a plan view of a portion of the band shown in Fig. 1.

Fig. 3 is an edge view of a portion of the band shown in Fig. 1.

Fig. 4 is a view similar to Fig. 3 showing unit blocks on the band.

Fig. 5 is a transverse sectional view on the line 5—5 of Fig. 2.

Fig. 6 shows the invention applied to a supporting shoe or head.

Referring to the drawings the brake block comprises a metal back 7 having a composition body 8 mounted thereon, the back being provided with openings 9 to receive the body material for anchoring the body to the back, or other anchoring means being employed if found desirable.

In Figs. 1–3 I have shown the invention embodied in strip form, the back plate 7 being a continuous strip having a plurality of bodies 8 mounted thereon, each body and that part of the strip back associated therewith constituting, in effect, a brake block. A continuous strip of blocks makes it convenient for handling and applying the blocks to the support, especially where it is desired to line the support with the blocks as shown on the band 10 Fig. 1. The metal back is provided with outwardly bent tongues 11 at its side edges and these tongues are arranged in pairs spaced apart, the tongues of each pair being oppositely disposed to receive a bolt 12 having a head 13 and a nut 14. The back of the block is approximately the same width as the support and the tongues 11 engage the side edges of the support, Fig. 5, and project beyond the support to receive the bolt extending across the support. The construction is such that by tightening the nut 14 the tongues are forced inwardly to tightly embrace and clamp the support at the side edges thereof for rigidly securing the block on the support. The ends 11' of the tongues may be bent over upon the head and the nut of a bolt for securing the bolt and nut against loosening. It will be observed that the blocks may be tightly clamped upon the support with a secure binding effect determined by the adjustment of the nut on the bolt and after this adjustment is made the bolt may be locked against loosening. While the invention is especially adapted for use in strip form on brake bands as shown in Fig. 1 it may be used on a supporting shoe or head 15 as shown in Fig. 6 and in unit blocks as shown in Fig. 4 on bands or shoes or heads or other supports. The invention provides a simple and efficient means whereby brake blocks may be easily and securely mounted upon bands or shoes or heads or other supports in friction brake assemblies of many different kinds.

I reserve the right to make all such changes in the form construction or arrangement of parts as fall within the scope of the following claims:

I claim:

1. A friction block for friction brakes having a metal back and a composition body mounted thereon, said back having rearwardly projecting and oppositely disposed integral tongues at its side edges adapted to embrace a support and to receive a bolt for securing the block on a support.

2. The combination of a support for a friction block, a friction block comprising a metal back to engage one face of the support and having a pair of oppositely disposed outwardly projecting integral tongues at the side edges thereof to engage the side edges of the support, and a bolt across the other face of the support and engaging said tongues for clamping the tongues and securing the block on the support, said tongues being sufficiently yieldable to provide for variations in width of the support and the back and to permit the tongues to be bent inwardly to tightly embrace and clamp the support at the side edges thereof for rigidly securing the block on the support.

3. The combination of a support for a friction block, a friction block comprising a metal back to engage one face of the support and having a pair of oppositely disposed outwardly projecting tongues at the side edges thereof to engage the side edges of the support, and a bolt across the other face of the support and engaging said tongues and having a head and a nut for clamping the tongues and securing the block on the support, said tongues being of sufficient length to permit the ends thereof to be bent into interlocking engagement with the head or nut of the bolt.

HUGH GILLIES.